United States Patent Office 3,533,750
Patented Oct. 13, 1970

3,533,750
AIR TESTING PROCESS
Jon W. Belisle, St. Paul, Minn., assignor to Minnesota Mining and Manufacturing Company, St. Paul, Minn., a corporation of Delaware
No Drawing. Filed Oct 16, 1967, Ser. No. 675,358
Int. Cl. G01n 21/06, 31/22, 31/04
U.S. Cl. 23—232                    7 Claims

ABSTRACT OF THE DISCLOSURE

Process for detecting toluene diisocyanate or other aromatic isocyanates, or aromatic amines, in ambient air, consisting in contacting a sample of the air with an acid solution of glutaconic aldehyde containing in admixture therewith an amount of cationic ion exchange resin. The isocyanate is converted to the corresponding amines; amines react with the reagent to produce a yellow color which is concentrated on the surface of the resin. The method is rapid and of high sensitivity. A composition useful for preparation of the test solution is prepared by mixing 1(4-pyridyl) pyridinium chloride hydrochloride with a cationic ion exchange resin in particulate form.

FIELD OF THE INVENTION

This invention relates to a method for determining the concentration of aromatic isocyanates and amines in samples of air. More particularly the invention relates to a method for the detection of toluene diisocyanate in air.

DESCRIPTION OF THE PRIOR ART

In recent years, the application of toluene diisocyanates (hereinafter "TDI") has become increasingly important in the general field of synthetic chemistry and in the manufacture of adhesives, protective coatings, foams, fluid polymers and urethane plastics.

The resulting increased human exposure to TDI has emphasized the importance of testing the atmosphere in the vicinity of TDI-producing or using operations to insure that isocyanate contamination of the air is held within safe limits. Furthermore, the previous maximum allowable concentration for human tolerance of TDI in air has been reduced by a recent study of the American Conference of Government Industrial Hygienists from 0.1 to 0.02 part per million. Exposure to higher concentrations may effect serious respiratory and other disorders as well as irritation of the eyes and mucous membranes.

The existing methods for such field tests have in common the disadvantages that they are relatively laborious and time consuming. They are, as a rule, based upon the aspiration of an air sample and the subsequent chemical analysis thereof.

According to a method for such analysis recently published, the typical procedure involves eight sequential steps. To carry out this procedure requires over 15 minutes for each determination. See, e.g. Grim et al., "Recent Isocyanate-in-air Analysis Studies," Am. Ind. Hyg. Assoc. J., 25, 285 (1964).

Chemically, the above-type method depends generally upon the rapid hydrolysis of the toluene diisocyanate to the corresponding toluene diamine derivative, diazotization of the diamine and coupling of the stable diazo compound with any of several compounds to produce an azo dye. The absorbance of the dye is measured colormetrically, and the amount of amine present is calculated from either a calibration curve or prepared color standards. See Marcali, K., "Microdetermination of Toluene Diisocyanate in Atmosphere," Anal. Chem., 29 (1957).

Known methods of determining TDI concentration in air thus are excessively time consuming and complicated. They require as a first step that an air sample be bubbled through a volume of liquid before the reagents can be added and analysis can proceed. Furthermore, the relatively low sensitivity of the test, due to the fact that the color change takes place in solution, requires a large sample, necessitating a 10–15 minute collection at 0.1 cu. ft. per minute. The instability of the reagents employed requires that they be freshly prepared to insure reliable test results.

While Feigl, F., "Spot Tests in Organic Analysis," Elsevier Publishing Co., New York, p. 245 (1966) and Fujimoto, M., "Chemist-Analyst," 54, 93 (1965) both describe tests for qualitative determination of primary amines, these do not specifically mention applicability to detection of toluene diisocyanate.

The Feigl test for primary aromatic amines, in which glutaconic aldehyde is the effective reagent, is not sensitive enough to detect 0.2 $\mu$g./ml. in a 10 ml. solution, as is necessary for the purposes of field tests for TDI where as little as 0.02 p.p.m. of TDI in 0.5 cu. ft. of air must be detected. The Fujimoto modification likewise is not sufficiently sensitive. Neither of these references suggests that the test could be modified to test for TDI in air, with useful sensitivity.

SUMMARY OF THE INVENTION

The present invention aims to provide a process for qualitatively and quantitatively analyzing air samples for TDI concentration almost simultaneously with collecting of the air sample.

A further object of this invention is to provide a process for determining TDI concentration-in-air samples in which the reagents employed are relatively stable and may be admixed in the correct proportions so that the chemical system will be in condition to analyze for TDI at the very moment an air sample is collected. Thus, the invention makes it unnecessary to make precise additions of reagents, etc. after the air sample is collected.

An additional object of the present invention is to provide a method for determining TDI concentration in which the color formation indicating the presence of TDI is sharply distinguishable by the human eye.

It has been found that when air containing low concentrations of TDI is brought into contact with a mixture of an aqueous solution of glutaconic aldehyde and a cation exchange resin a readily observable color change is produced. Because the color change takes place on the surface of the resin particles rather than in the solution, the change is discernable even when the reactants are present in very minute quantities. Thus, the sensitivity of the test for toluene diisocyanate is greatly increased over either the spot test method, which requires a relatively undiluted sample, or the diazotization-coupling method, in which the color change takes place in the solution.

The observable color formation which takes place on the resin particles is an orange-red which is directly related to the amount of amine present. Concentration may be conveniently measured by comparison to color standards.

DETAILED DESCRIPTION OF THE INVENTION

The process of the present invention broadly consists in generating and maintaining during the test an acidic aqueous solution consisting essentially of glutaconic aldehyde and water in admixture with particles of a cationic resin, which mixture, when contacted with 0.5 cu. ft. of an air sample containing 0.005 p.p.m. or more of TDI, almost instantaneously displays orange-red color formation on the cation exchange resin particles. It appears that in this solution the TDI is hydrolyzed to toluene diamine which reacts with the glutaconic aldehyde to produce an orange-red polymethine dye on the resin beads.

Glutaconic aldehyde is very conveniently produced by the reaction of alkali with 1(4-pyridyl)pyridinium chloride hydrochloride, and subsequent acidification, although other sources are acceptable, such as the sodium enolate form of glutaconic aldehyde.

The solution and the resin described above are placed in an "impinger" (a device by which the air sample is brought in contact with the test reagents) during the test. Conveniently, the test mixture is prepared by combining in the following order: water, an acidic cation exchange resin (preferably having the composition of polystyrene nuclear sulfonic acid, e.g. that sold under the trade name "Dowex 50W–X1" by the Dow Chemical Company, Midland, Mich.) a source of glutaconic aldehyde (e.g. the pyridyl compound), base and acid.

As the resin apparently does not itself enter into the color-forming reaction, any cation-exchanger which is insoluble in the acidic reaction mixture, and which is of a color which does not interfere with the observation of the color formed in the test reaction, is suitable. This is not to say that resins which are somewhat colored of themselves cannot be employed, as it will be apparent to the art that a color standard for known concentrations of the isocyanate in air can be prepared for any resin system and the background color of the resin is thereby compensated for, but light-colored resins are preferred. Similarly, strongly acid cationic ion exchange resins are preferred as tending to bind the colored reaction products more completely thus giving a more intense color.

Many cationic ion exchange resins are commercially available, and illustrative examples of such materials include sulfonated phenols, sulfonated polystyrenes, polyacrylic carboxylic acid resins, polystyrene phosphonous acid resins and the like. These are used in finely divided particulate form, conveniently about 50-100 mesh size; the exact particle size is not critical.

Other acceptable cation exchange resins are listed in "The Merck Index of Chemicals and Drugs," seventh ed., p. 1575 ff. The addition of base, e.g. sodium hydroxide, brings about conversion of the pyridyl reagent to the monosodium enolate of glutaconic aldehyde, and just sufficient base is added to accomplish complete conversion, as shown by the formation of a strong yellow solution. Ordinarily an amount of the order of about $10^{-5}$ mole of the aldehyde in 10 ml. is used (i.e. a $10^{-3}$ molar solution), as this is a sufficient amount for determination of a wide range of concentrations of amines or isocyanates. The exact amount is not critical, and a 10-fold excess over that stated could be used, but is unnecessary.

Following formation of the enolate salt, the solution is acidified until it is substantially colorless, using a strong acid, e.g. hydrochloric acid. Sufficient acid is used to produce the color change and to insure that the solution is acidic. When hydrochloric acid is used, the final pH is of the order of about pH 1, although this is also not critical. The function of the acidity is to provide for hydrolysis of isocyanate to amine, and formation of amine salt to bring about solubility of the amine in the aqueous liquid. As small quantities of amine are involved it will be evident that large amounts of acid are not needed.

It will be understood that air containing toluene diamine or other aromatic mono- or diisocyanate or aromatic mono- or diamine can also be tested by the method of the invention if desired.

Drawing an air sample containing TDI through the impinger causes a red-orange color formation on the resin beads. As a rule an impinger containing about 10 ml. of the liquid mixture is used.

The sensitivity of the test of the invention is such that it will disclose the presence of the concentration of 0.005 p.p.m. of TDI in 0.5 cu. ft. of air. The concentration of TDI in excess of this amount may then be quickly calculated from either a calibration curve or prepared color standards The following description of one embodiment of the invention will more specifically illustrate the invention.

EXAMPLE 1

Procedure

The reagents used in this exampe were in the following form:

Reagent No. 1: A solution of 0.38 gram of 1(4-pyridyl)-pyridinium chloride hydrochloride in 100 ml. of water.

Reagent No. 2: A solution of 16 grams of sodium hydroxide in 100 ml. of water.

Reagent No. 3: 58 ml. of concentrated (37 percent) hydrochloric acid in 100 ml. of water.

The cation exchange resin employed was Dowex 50W–X1, 50–100 mesh in the hydrogen form.

Preparation of the test solution

A test tube-type impinger adapted to fit an air sampling pump was charged with approximately 8 ml. of water and 0.25 gram of cation exchange resin. Ten drops of reagent No. 1 were added, followed by ten drops of reagent No. 2 (i.e. the solution was made basic as was indicated by the change from colorless to yellow). After shaking briefly, ten drops of reagent No. 3 were added (i.e. the solution was acidified as was indicated by the change from yellow to very light yellow).

Conveniently, the cation exchange resin and the 1(4-pyridyl)pyridinium chloride hydrochloride can be premixed and used for the preparation of test solutions in carrying out the procedure of the invention. A substantially homogeneous mixture is made from 100 grams of finely divided cation exchange resin, for example, Dowex–50, and from about .5 to 2 grams of finely divided 1(4-pyridyl)pyridinium chloride hydrochloride. This mixture is added to an amount of water or aqueous base in preparing the test solution. Preferably about 1 gram of the pyridyl-pyridinium hydrochloride is employed, as this amount, in admixture with 100 grams of the resin, produces an approximately $10^{-3}$ molar solution of glutaconic aldehyde when 0.25 gram of the mixture is employed in the above procedure in place of the separate solution of pyridyl-pyridinium chloride hydrochloride. In this way, reagent solution No. 1 is eliminated and the preparation of the test solution is simplified.

Air sampling and analysis

Within six hours of preparation of the test solution (a longer period would decrease the sensitivity of the test solution), the impinger was connected to an air sampling pump with a pumping capacity of 0.1 cubic foot per minute. The pump with the impinger attached was then actuated for approximately five minutes in a manufacturing area where polyurethane foaming operations were under way. (Two 20 gallon reservoirs, one containing polyol, the other toluene diisocyanate, were being reacted.) The pump was located approximately 12 feet from the reservoirs. After approximately two minutes of air sampling (i.e. 0.2 cu. ft.), an orange-yellow color appeared on the resin beads in the impinger. At the end of the five minute sampling period, when 0.5 cu. ft. of air had been sampled, the color had intensified to a deeper orange. The orange color thus observed was then visually compared with calibrated color standards mounted on white paper, corresponding to previously determined known concentrations of TDI.

The visual comparison indicated .015 p.p.m. of toluene diisocyanate in the vincinity of the foaming operations.

The simplicity of the procedure is quite evident. It will be apparent to those skilled in the art that modifications of the procedure can be made to suit particular needs. Thus, for example, simply continuing sampling for a longer period will allow detection of even lower levels of concentration. Such modifications also fall within the scope of the invention and the appended claims.

What is claimed is:

1. A method for monitoring low concentrations of aromatic isocyanates or aromatic amines in air which comprises introducing a sample of air into an impinger containing:
   (1) an acidified aqueous test solution containing glutaconic aldehyde, and
   (2) a particulate cation exchange resin whereby when aromatic isocyanates or amines are present in the air sample, a visible color change occurs on the surface of the cation exchange resin substantially simultaneously upon contact of said air sample with the solution in the impinger.

2. The method according to claim 1, wherein the concentration of aromatic isocyanates or amines in the air sample is determined by comparison of the color produced with color standards for known concentrations.

3. The method according to claim 1, wherein glutaconic aldehyde is generated in situ by sequential treatment of 1(4-pyridyl)pyridinium chloride hydrochloride with base and acid.

4. The method according to claim 1, wherein the acidified aqueous test solution is prepared by the following steps comprising sequentially:
   (1) making an aqueous solution of 1(4-pyridyl)pyridinium chloride hydrochloride sufficiently basic to cause the solution to exhibit a strong yellow color,
   (2) acidifying the yellow solution of step 1 sufficiently to cause the solution to become substantially colorless.

5. The method according to claim 1, wherein cation exchange resin is sulfonated polystyrene.

6. The method according to claim 1, wherein the aqueous test solution containing glutaconic aldehyde is prepared by first converting an aqueous solution of 1(4-pyridyl)pyridinium chloride hydrochloride to an aqueous solution of the monosodium enolate thereof and then acidifying the resulting solution.

7. The method according to claim 6 wherein the aromatic isocyanate is toluene diisocyanate and the cation exchange resin is sulfonated polystyrene.

References Cited

Fujimoto, M., Chemist-Analyst, vol. 54, pp. 58–62, 92–95 (1965).

Marcali, K., Analytical Chemistry, vol. 29, pp. 552–558 (1957).

JOSEPH SCOVRONEK, Primary Examiner

E. A. KATZ, Assistant Examiner

U.S. Cl. X.R.

252—408